US011895464B2

(12) United States Patent
Shen et al.

(10) Patent No.: US 11,895,464 B2
(45) Date of Patent: Feb. 6, 2024

(54) MEMS SPEAKER AND SPEAKER ASSEMBLY STRUCTURE

(71) Applicant: AAC Microtech (Changzhou) Co., Ltd., Changzhou (CN)

(72) Inventors: Yu Shen, Shenzhen (CN); Shiyang Cheng, Shenzhen (CN); Yiwei Zhou, Shenzhen (CN); Qiang Dan, Shenzhen (CN); Yang Li, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 0 days.

(21) Appl. No.: 17/880,701

(22) Filed: Aug. 4, 2022

(65) Prior Publication Data

US 2023/0217192 A1 Jul. 6, 2023

(30) Foreign Application Priority Data

Dec. 31, 2021 (CN) ......................... 202111668046.7

(51) Int. Cl.
*H04R 19/02* (2006.01)
*H04R 1/28* (2006.01)

(52) U.S. Cl.
CPC ........... *H04R 19/02* (2013.01); *H04R 1/2811* (2013.01); *H04R 2201/003* (2013.01); *H04R 2499/11* (2013.01)

(58) Field of Classification Search
CPC .................. H04R 19/02; H04R 1/2811; H04R 2201/003; H04R 2499/11; H04R 1/10; H04R 1/24; H04R 1/28; H04R 9/02; H04R 9/06; H04R 17/00
See application file for complete search history.

(56) References Cited

U.S. PATENT DOCUMENTS

2005/0201588 A1* 9/2005 Funahashi ................ H04R 7/26 381/423
2006/0062420 A1* 3/2006 Araki ..................... H04R 23/00 381/396
2018/0324519 A1* 11/2018 Park ......................... H04R 1/28
2022/0038823 A1* 2/2022 Gao ..................... H04R 1/2811

FOREIGN PATENT DOCUMENTS

CN 106162459 A * 11/2016 ............... H04R 9/02

* cited by examiner

*Primary Examiner* — Oyesola C Ojo
(74) *Attorney, Agent, or Firm* — W&G Law Group

(57) ABSTRACT

A MEMS speaker includes a substrate, a vibration sounding portion and a baffle plate with a through hole. The baffle plate, the substrate and the vibration sounding portion form a sounding inner cavity, and a volume of the sounding inner cavity can adjust a resonant frequency of the sounding inner cavity, so that the resonance frequency of the sounding inner cavity resonate with a preset frequency of the MEMS speaker. A speaker assembly structure further provided includes a speaker, a fixing portion, and a baffle plate, the speaker and the baffle plate together enclose and form a sounding inner cavity, the fixing portion and the speaker are fixedly connected together and form a sealing structure. A sound pressure level of the MEMS speaker and the speaker assembly structure is high and harmonic distortion of the MEMS speaker and the speaker assembly structure is small.

7 Claims, 8 Drawing Sheets

100

MEMS SPEAKER AND SPEAKER ASSEMBLY STRUCTURE

TECHNICAL FIELD

The present disclosure relates to the field of electroacoustic conversion, and in particular to a Micro-Electro-Mechanical-Systems (MEMS) speaker and a speaker assembly structure for portable mobile electronic products.

BACKGROUND

Speakers are widely used in portable mobile electronic products, such as mobile phones, to convert audio signals into sounds to play. Miniaturization of portable mobile electronic products drives miniaturization of the speakers more and more widely. A sound pressure level (SPL) and a total harmonic distortion (THD) of the speakers are important indicators of the acoustic performance.

However, due to the miniaturization of the speakers in the related art, a sounding area of a vibration sounding portion becomes small, which is difficult to obtain a high SPL. And resonant frequency ($f_0$) of the miniaturized speakers is higher. While the miniaturized speakers are at a resonant state with a high resonant frequency ($f_0$), the SPL greatly changes, and sensitivity of which accordingly increases. Thus, the harmonic distortions of the speaker are relatively larger at ½ frequency and at ⅓ frequency with respective to the resonant frequency ($f_0$), which leads to poor acoustic effect of the speakers. For miniaturized speakers, designers generally use a method of adding flexible films in the speaker to reduce a peak value of the resonant peak in frequencies, so as to reduce THD. However, the method does not good effects and is difficult to meet design requirements.

Therefore, it is necessary to provide a new speaker and a related design method to solve the above technical problems.

SUMMARY

The present disclosure aims to provide a MEMS speaker and a speaker assembly structure, where a sound pressure level of the speaker is high and harmonic distortion of the speaker is small.

In order to achieve above aims, in a first aspect, the present disclosure provides a MEMS speaker, including a substrate, a vibration sounding portion, and a baffle plate. A first end and a second end of the substrate are open and the substrate is a hollow shape. The vibration sounding portion is configured to emit a sound wave within a range of human ear auditory frequency when excited by an electrical signal, and the vibration sounding portion is fixed to and covered on the first end of the substrate, and the sound wave generated by vibration of the vibration sounding portion conforms to a classical sound wave theorem. The baffle plate is covered and fixed on the second end of the substrate. The baffle plate, the substrate, and the vibration sounding portion together form a sounding inner cavity, a volume of the sounding inner cavity is configured to adjust a resonance frequency of the sounding inner cavity, so that the resonance frequency of the sounding inner cavity resonates with a preset frequency of the MEMS speaker. A through hole is defined on the baffle plate, the sounding inner cavity communicates with an outside world through the through hole, and a volume of the through hole is configured to adjust a sound pressure level and harmonic distortion of the MEMS speaker within a working frequency range.

As an improvement, a number of the through hole is one or more.

As an improvement, a cross-sectional, of the through hole, being perpendicular to a vibration direction is one of a circle, an oval, a square, a rectangle, and a triangle.

As an improvement, the MEMS speaker is a piezoelectric speaker made by a MEMS process.

As an improvement, the vibration sounding portion is driven by an electromagnetic signal, a piezoelectric signal or an electrostatic signal.

As an improvement, the substrate and the baffle plate are connected by a bonding process.

As an improvement, a cross-sectional, of the through hole, being perpendicular to a vibration direction is one of a circle, an oval, a square, a rectangle, and a triangle.

In a second aspect, the present disclosure further provides a speaker assembly structure. The speaker assembly structure emits a sound wave within a range of human ear hearing frequency when excited by an electrical signal, and includes a speaker, a fixing portion, and a baffle plate. One end of the fixing portion and the baffle plate is fixedly connected to form an accommodating space, the speaker is accommodated in the accommodating space, the speaker and the baffle plate together enclose and form a sounding inner cavity; a volume of the sounding inner cavity is configured to adjust a resonant frequency of the sounding inner cavity so that the resonant frequency of the sounding inner cavity resonates with a preset frequency of the speaker. A through hole is defined on the baffle plate and passed through the baffle plate, the sounding inner cavity is communicated with an outside world through the through hole, a volume of the through hole is configured to adjust a sound pressure level and harmonic distortion of the speaker in the working frequency range, and the fixing portion and the speaker are fixedly connected to form a sealing structure.

As an improvement, the fixing portion and the speaker are fixedly connected through an adhesive substance to form the sealing structure.

As an improvement, the adhesive substance is silicon.

As an improvement, the fixing portion and the baffle plate are formed by an integral molding process.

As an improvement, a number of the through hole is one or more, a cross-sectional, of the through hole, being perpendicular to a vibration direction is one of a circle, an ellipse, a square, a rectangle, and a triangle.

As an improvement, the speaker is a MEMS speaker.

Compared with the related art, the speaker of the present disclosure is formed by a baffle plate, a substrate, and a vibration sounding portion together to form a sounding inner cavity, and a through hole is defined on the baffle plate, and the resonant frequency of the cavity is adjusted by the volume of the sounding inner cavity. The volume of the through hole is configured to adjust the sound pressure level and harmonic distortion of the speaker within the working frequency range. This structure allows designers to reasonably adjust the volume of the sounding inner cavity and that of the through hole, so that the sound pressure level of the speaker is high while the harmonic distortion of the speaker is small. In addition, the speaker assembly structure of the present disclosure further includes the through hole defined on the baffle plate, and the resonant frequency of the cavity is adjusted through the volume of the sounding inner cavity. The volume of the through hole is configured to adjust the sound pressure level and harmonic distortion of the speaker in the working frequency range. This structure allows designers to reasonably adjust the volume of the sounding inner cavity and that of the through hole, so that the sound pressure level of the speaker is high while the harmonic distortion of the speaker is small.

BRIEF DESCRIPTION OF THE DRAWINGS

In order to more clearly illustrate technical solutions in embodiments of the present disclosure, the drawings required in the description of the embodiments will be briefly introduced below. Obviously, the drawings in the following description are merely some embodiments of the present disclosure, and those of ordinary skill in the art may obtain other drawings according to these drawings without creative efforts and in which.

DETAILED DESCRIPTION OF EMBODIMENTS

The technical solutions of the embodiments of the present disclosure are clearly and completely described below with reference to the drawings in the embodiments of the present disclosure. Apparently, the described embodiments are merely some rather than all of the embodiments of the present disclosure. All other embodiments obtained by those of ordinary skill in the art based on the embodiments of the present disclosure without creative efforts shall fall within the protection scope of the present disclosure.

First Embodiment

Figure 1:
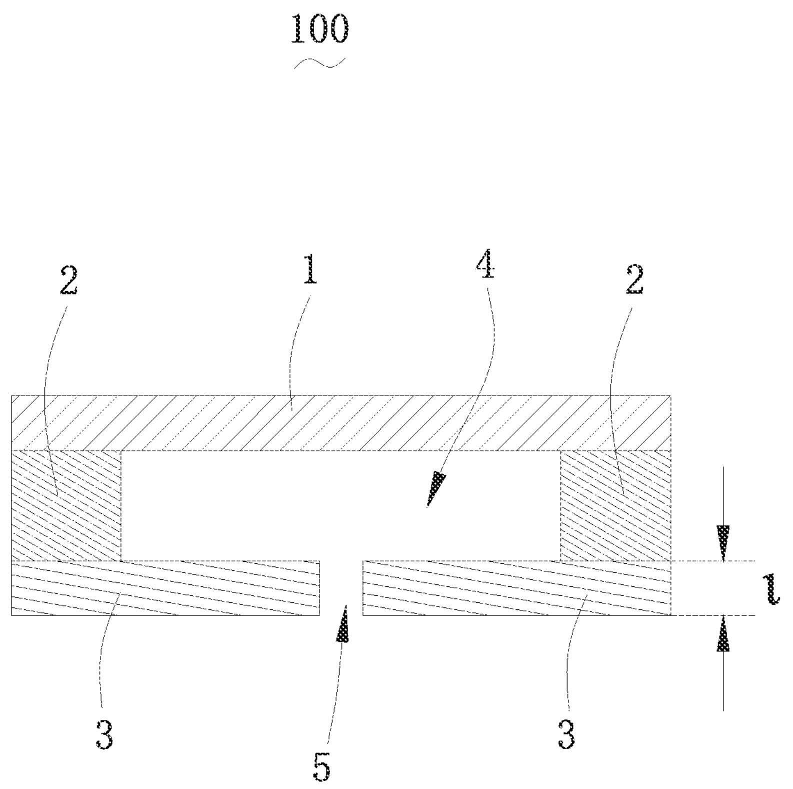
FIG. 1 is a structural diagram of a MEMS speaker according to a first embodiment of the present disclosure.

A MEMS speaker 100 is provided by the present disclosure. Please refer to FIGS. 1-6. FIG. 1 is a schematic diagram of the MEMS speaker according to the first embodiment of the present disclosure. Specifically, the MEMS speaker 100 includes a vibration sounding portion 1, a substrate 2 with two open ends in a hollow shape, and a baffle plate 3.

The vibration sounding portion 1 is configured for emitting a sound wave within a range of human ear auditory frequency when it is excited by an electrical signal. The vibration sounding portion 1 is driven by an electromagnetic signal, a piezoelectric signal, or an electrostatic signal.

The vibration sounding portion 1 is connected with the substrate 2. Specifically, the vibration sounding portion 1 is fixed to and covered on one of the two open ends of the substrate 2.

In the first embodiment, the MEMS speaker 100 is made via a process of a micro electro mechanical system. The micro electro mechanical system (hereinafter MEMS) is also known as microelectronics mechanical systems, micro systems, micro machines, etc., refers to high-tech devices with sizes of a few millimeters or less. The vibration sounding portion 1 is a piezoelectric speaker made via a MEMS process. The vibration sounding portion 1 made by the MEMS process is beneficial for a miniaturization of the MEMS speaker 100. Of course, not limited to this, it is also feasible to fabricate the speaker via a traditional process, and the vibration sounding portion 1 fabricated via the traditional process is also feasible, for example, speakers and piezoelectric ceramic chips commonly used in the art.

The substrate 2 is configured to form a sounding inner cavity 4.

The baffle plate 3 is connected with the substrate 2 via a bonding process. The baffle plate 3 is covered and fixed on the other one of the two open ends of the substrate 2. The baffle plate 3, the substrate 2 and the vibration sounding portion 1 together enclose and form the sounding inner cavity 4. A volume of the sounding inner cavity 4 is configured to adjust a resonant frequency of the sounding inner cavity 4, so that the resonant frequency of the sounding inner cavity 4 resonates with a preset frequency of the MEMS speaker 100.

A through hole 5 is provided by the baffle plate 3 and passed through the baffle plate 3. The sounding inner cavity 4 communicates with the outside world through the through hole 5. A volume of the through-hole 5 is configured to adjust a sound pressure level and a harmonic distortion of the MEMS speaker 100 within a working frequency range.

The baffle plate 3 can provide with one or more through holes 5. In the first embodiment, there is one through hole 5.

A cross-sectional shape of the through hole 5 along a vibration direction perpendicular to the vibration sounding portion 1 is any one of a circle, an oval, a square, a rectangle and a triangle. In the first embodiment, the cross-sectional shape of the through hole 5 along the vibration direction perpendicular to the vibration sounding portion 1 is the circle.

The volume of the sounding inner cavity 4 and the volume of the through hole 5 can adjust acoustic indicators of the MEMS speaker 100. Specifically, a cross-sectional area of the sounding inner cavity 4 along the vibration direction perpendicular to the vibration sounding portion 1 is $S_1$, a cross-sectional area of the through hole 5 along a direction perpendicular to the vibration direction is $S_2$, a length of the through hole 5 along the vibration direction perpendicular to the vibration sounding portion 1 is l, and a sound intensity transmission coefficient of the MEMS speaker 100 is $t_i$, $P_t$ is a transmitted sound pressure, $P_i$ is a sound pressure of an incident wave; which satisfies a following formula (1):

$$t_i = \frac{|P_t|^2}{|P_i|^2} = \frac{4}{4\cos^2 kt + (S_{12} + S_{21})^2 \sin^2 kt};$$

K is a sound intensity transmission coefficient constant, $$S_{12} = \frac{S_2}{S_1},\ S_{21} = \frac{S_1}{S_2}.$$

Figure 2:
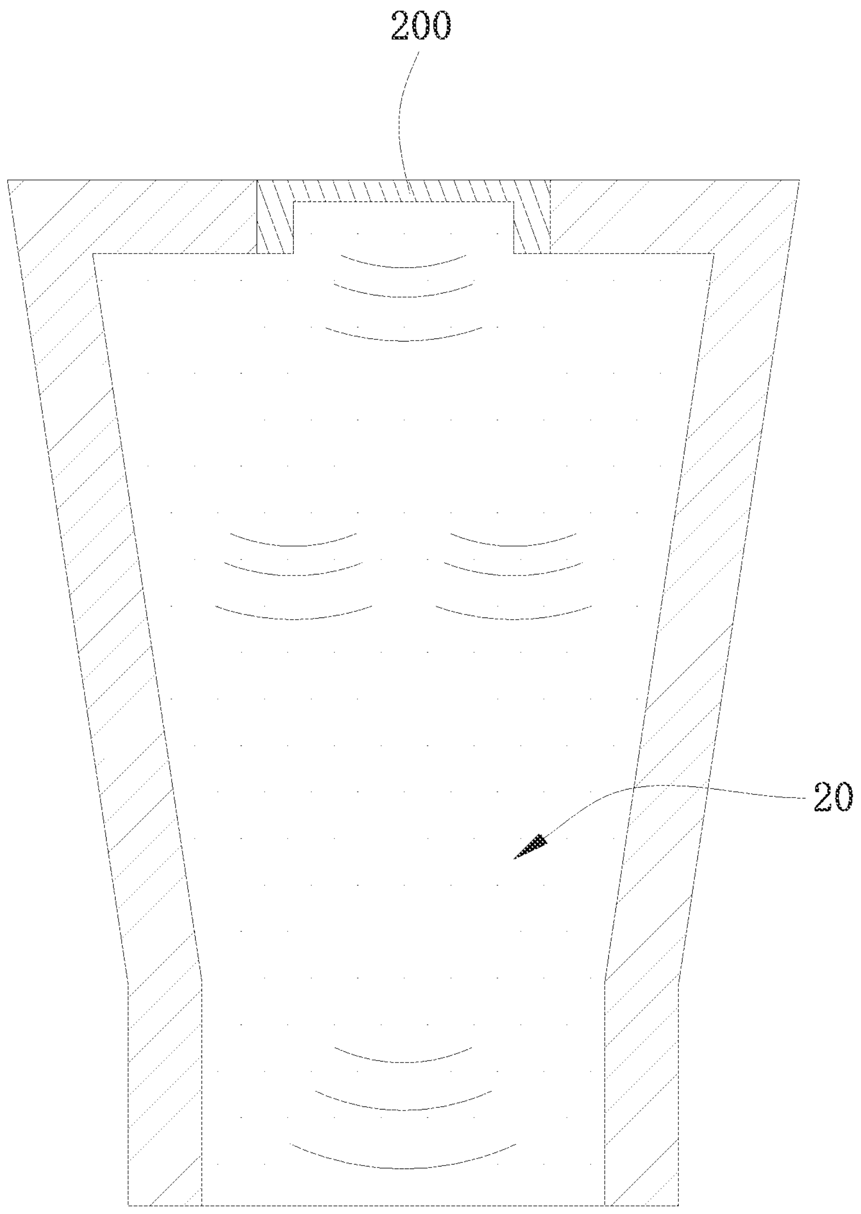
Related Art FIG. 2
FIG. 2 is a schematic diagram of an application structure of a MEMS speaker in related art.
Figure 3:
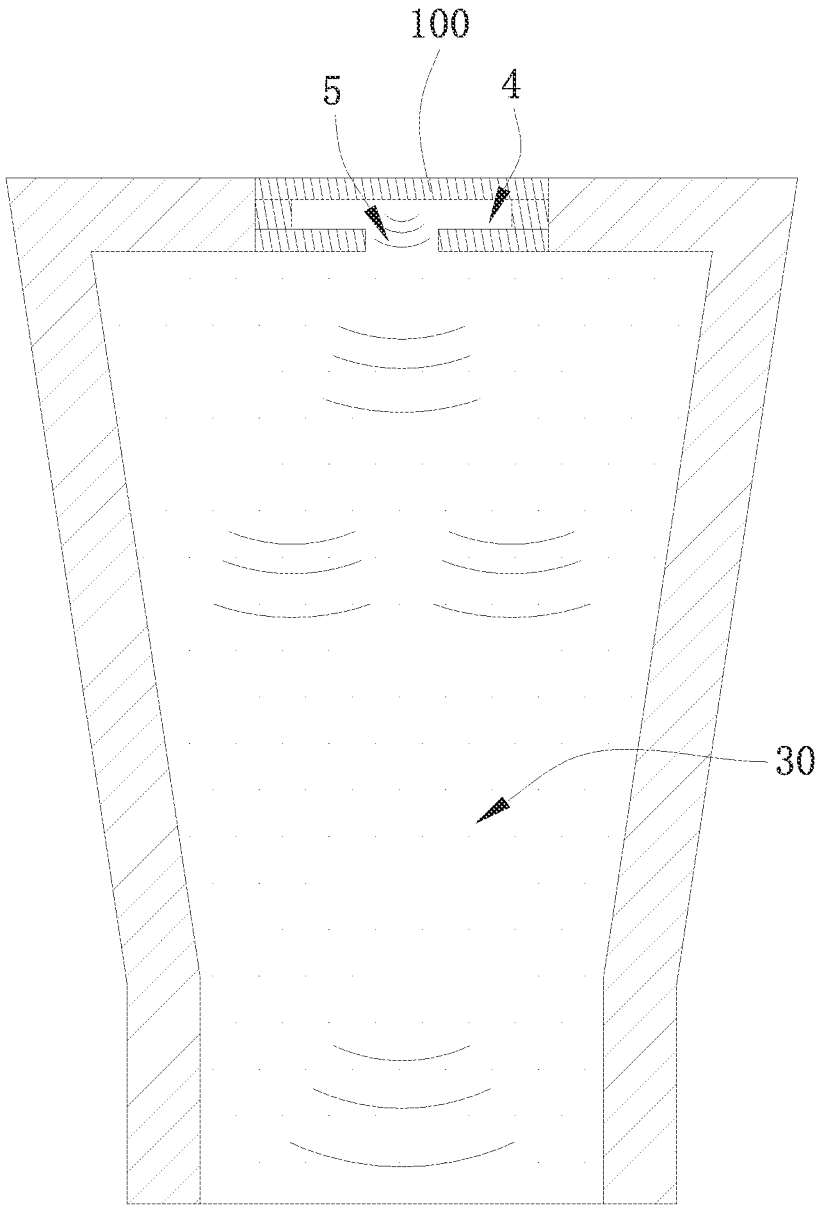
FIG. 3 is a schematic diagram of an application structure of the MEMS speaker according to the first embodiment of the present disclosure.

Please refer to FIGS. 2-3 at the same time. FIG. 2 is a simplified schematic diagram of a sound emitted by the MEMS speaker 200 of the related art propagating through the external auditory canal. The MEMS Speaker 200 is a traditional MEMS speaker. A cavity 20 is a sound transmission cavity, namely the human ear canal. An opening position of the cavity 20 is where a sound is received, namely the human eardrum.

FIG. 3 is a simplified schematic diagram of a sound emitted by the MEMS speaker 100 of the first embodiment of the present disclosure. A cavity 30 is a sound transmission cavity, namely the human ear canal. An opening position of the cavity 30 is where a sound is received, namely the human eardrum.

Figure 4:
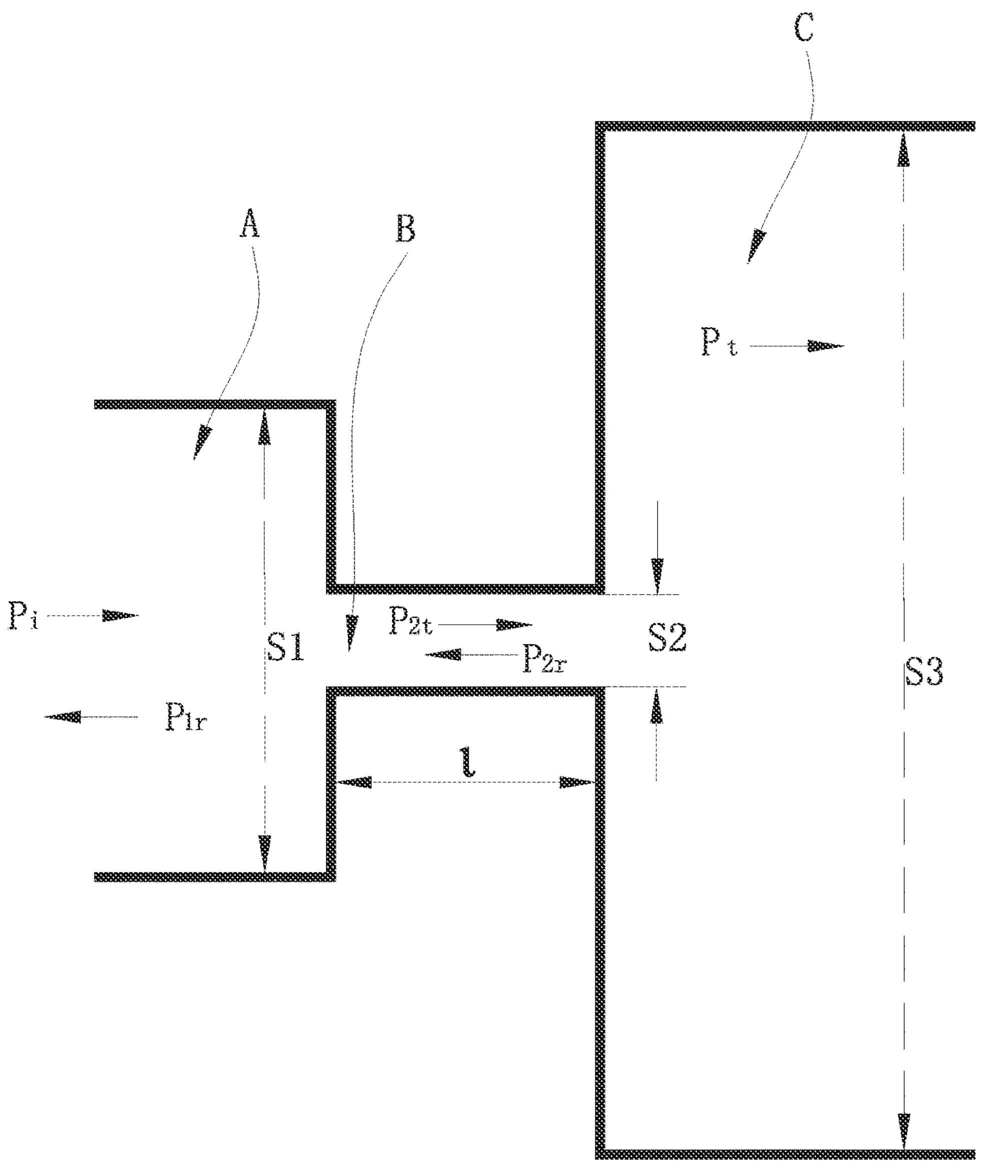
FIG. 4 is an application principal diagram of FIG. 3.
Figure 5:
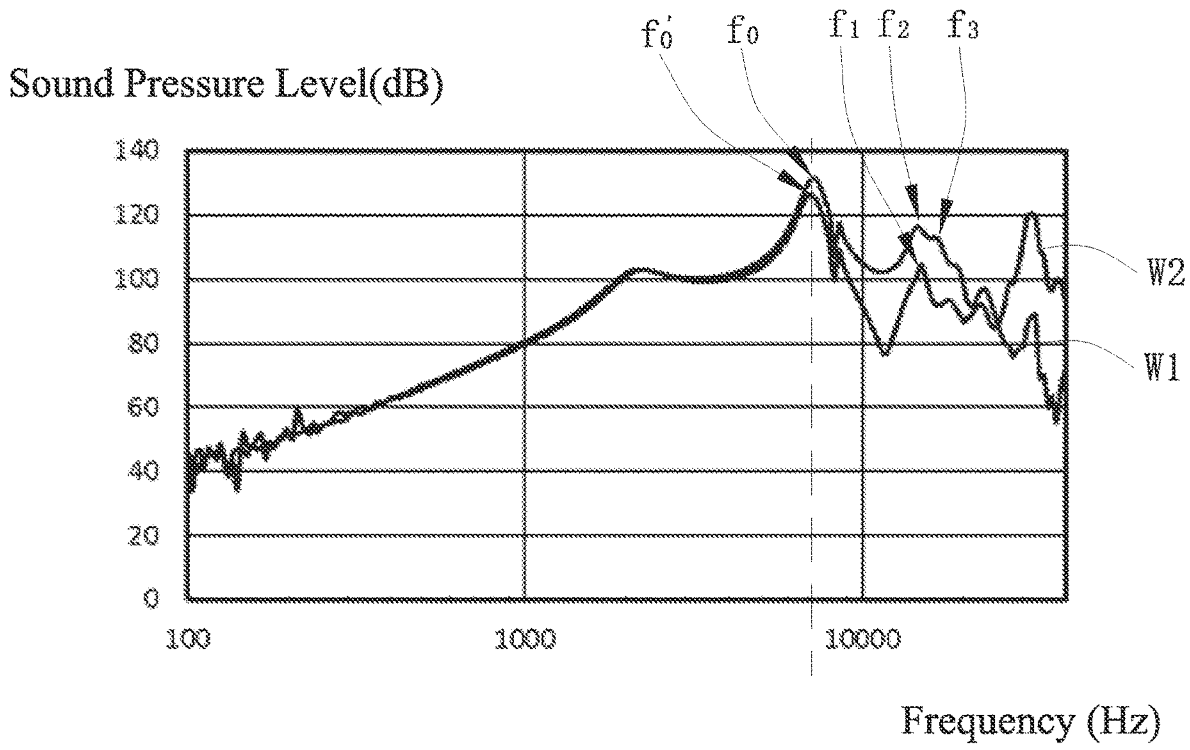
FIG. 5 is a curve diagram showing relation curves between sound pressure levels and frequencies of MEMS speaker of the related art and MEMS speaker of the first embodiment of the present disclosure.

Refer to FIG. 4, which is an application principal diagram of FIG. 3. A sound transmission path in FIG. 3 can be simplified to the principal diagram in FIG. 4. Wherein, A represents the sounding inner cavity 4, and its cross-sectional area is S1. B represents the through hole 5, and its cross-sectional area is S2. C represents the cavity 30, and its cross-sectional area is S3.

The sound pressure of the incident wave at a position A is $P_i$. At an interface of A and B, a sound wave corresponding to the sound pressure $P_i$ can be reflected and transmitted, a sound pressure of a reflected wave is $P_{1r}$, and a sound pressure of a transmitted wave is $P_{2t}$.

The sound pressure of the incident wave at a position B is $P_{2t}$. At an interface of B and C, a sound wave corresponding to the sound pressure $P_{2t}$ can be reflected and transmitted, a sound pressure of a reflected wave of the sound pressure $P_{2t}$ is $P_{2r}$, and a sound pressure of a transmitted wave of the sound pressure $P_{2t}$ is $P_t$ shown at a position C.

Designers can adjust the sound pressure level and the harmonic distortion of the MEMS speaker 100 through the cross-sectional area S1 of the sounding inner cavity 4, the cross-sectional area S2 of the through hole 5, and the length t of the through hole, the principle of which is a sound intensity transmission coefficient is $t_1$, and satisfies the following formula (1):

$$t_i = \frac{|P_t|^2}{|P_i|^2} = \frac{4}{4\cos^2 kt + (S_{12} + S_{21})^2 \sin^2 kt},$$

and S12 satisfies $$S_{12} = \frac{S_{12}}{S_1},$$

S21 satisfies $$S_{21} = \frac{S_1}{S_2}.$$

As shown by the formula (1), a magnitude of the transmission sound pressure level is related to the cross-section area S1 and the cross-sectional area S2, it is also related to the length I of the through hole 5 and a wavelength λ, (or frequency f) of the preset frequency, wherein, only when $$kt = \frac{2\pi t}{\lambda}$$

or kt=nπ(n is a positive integer), all sound waves can pass through. Thus, designers can adjust the cross-sectional area S1, the cross-sectional area S2 and the length I according to the formula (1), filter or reduce acoustic pressure of the wavelength λ, (or frequency f) of the preset frequency, then a ½ frequency harmonic distortion and a ⅓ frequency harmonic distortion at the preset frequency will be accordingly attenuated or reduced.

In the first embodiment, taking working frequency ranges of the vibration sounding portion 1 as a frequency of 6000 Hz to a frequency of 20000 Hz as an example, designers can reduce the sound pressure above the frequency of 20000 Hz by adjusting values of the cross-sectional area S1, the cross-sectional area S2 and the length l in the formula (1), thereby reducing a magnitude of the resonance distortion in the working frequency range of the frequency of 6000 Hz to the frequency of 20000 Hz. Please refer to FIG. 5, which shows relation curves between sound pressure levels and frequencies of MEMS speaker of the related art and MEMS speaker of the first embodiment of the present disclosure. Wherein, W2 is a relation curves between the sound pressure levels and frequencies of the MEMS speaker 200 of the related art in FIG. 2. The resonant frequency $f_0'$ of the MEMS speaker 200 itself can be obtained according to W2. Meanwhile, the resonant frequency f1 generated by the cavity 20 can also be obtained from W1.

W1 is a relation curves between the sound pressure levels and frequencies of the MEMS speaker 100 disclosed by the present disclosure in FIG. 2. The resonant frequency $f_0$ of the MEMS speaker 100 itself can be obtained according to W1. Meanwhile, the resonant frequency $f_3$ generated by the cavity 30 can also be obtained from W2, and the resonant frequency $f_2$ generated by the cavity formed by the sounding inner cavity 4 and the through hole 5 can also be obtained from W2. By adjusting the cross-sectional area S1, the cross-sectional area S2 of the through hole 5, and the length I of the through hole 5 in the formula (1), the resonant frequency $f_2$ and the resonant frequency $f_3$ are enabled to be very close to each other, and the resonant frequency $f_2$ and the resonant frequency $f_3$ are very close to each other. A combined effect of the resonant frequency $f_2$ and the resonant frequency $f_3$, the sound pressure level within the working frequency from 6000 Hz to 20000 Hz is effectively improved.

Figure 6:
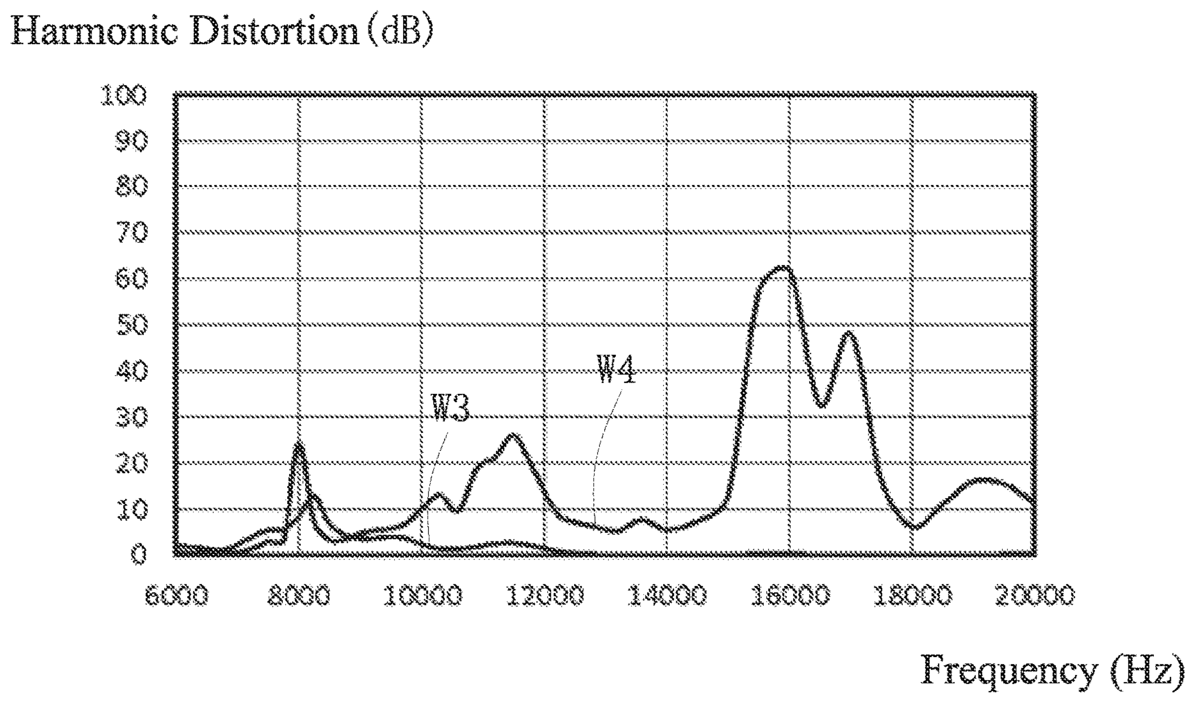
FIG. 6 shows relation curves between harmonic distortion and frequency of MEMS speaker of the related art and MEMS speaker of the first embodiment of the present disclosure.

Please refer to FIG. 6, which shows relation curves between harmonic distortion and frequency of MEMS speaker of the related art and MEMS speaker of the first embodiment of the present disclosure. Wherein, W3 is relation curves between the sound pressure levels and frequencies of the MEMS speaker 200 of the related art in FIG. 2. W4 is relation curves between the sound pressure levels and frequencies of the MEMS speaker 100 disclosed by the present disclosure in FIG. 3. It can be seen from the figure, the through hole 5 can play a filtering role in the formula (1), so that the sound pressure of the external high frequency with a frequency of 20000 Hz is reflected and thus making the sound pressure passed through the through hole 5 decreases. Therefore, the harmonic distortion within the working frequency from 6000 Hz to 20000 Hz is effectively reduced.

Therefore, by adjusting the cross-sectional area S1, the cross-sectional area S2 of the through hole 5, and the length I of the through hole 5 in the formula (1), the sound pressure level of the MEMS speaker 100 of the present disclosure can be effectively improved, and the harmonics Distortion (THD) thereof is effectively reduced.

Embodiment Two

The present disclosure also provides a speaker assembly structure 400.

Figure 7:
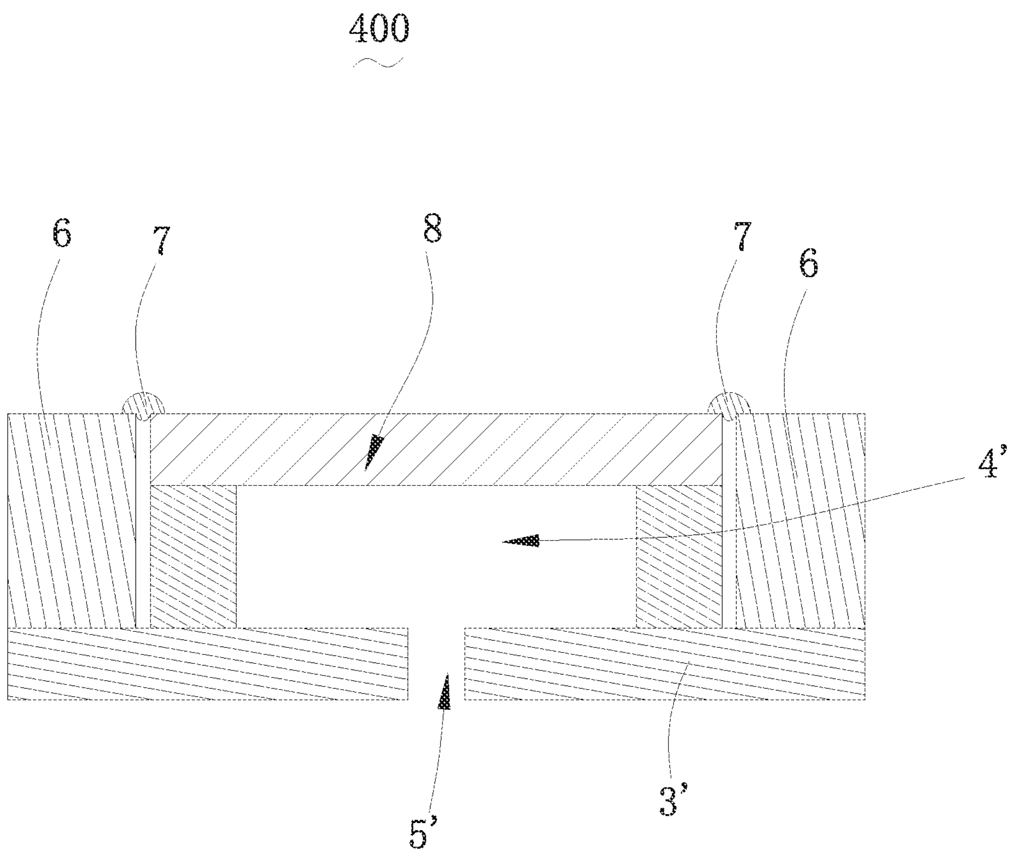
FIG. 7 is a schematic diagram of a speaker assembly structure according to a second embodiment of the present disclosure.

Please refer to FIG. 7, which is a schematic diagram of a speaker assembly structure 400 according to a second embodiment of the present disclosure.

The speaker assembly structure 400 emits sound waves in the range of human ear hearing frequency when it is excited by an electrical signal. The speaker assembly structure 400 includes a speaker 8, a fixing portion 6 and a baffle plate 3'. One end of the fixing portion 6 fixedly connected to the baffle plate 3' form an accommodating space, and the speaker 8 is accommodated in the accommodating space. The speaker 8 and the baffle plate 3' together enclose and form a sounding inner cavity 4'; a volume of the sounding inner cavity 4' is configured to adjust a resonance frequency of the sounding inner cavity 4', so that the resonance frequency of the sounding inner cavity 4' resonates with a preset frequency of the speaker 8.

The fixing part 6 fixedly connected with the speaker 8 to form a sealing structure. And the sealing structure is formed while the fixing part 6 is fixedly connected with the speaker 8 through an adhesive substance7. Of course, it is not limited to this, and in other embodiments, the fixing portion 6 can also be connected to the speaker 8 by welding, and form a fixed sealing structure.

The through hole 5' is provided via the baffle plate 3' and is passed through the baffle plate 3', and the sounding inner cavity 4' communicates with the outside world through the through hole 5'. The volume of the through hole 5' is configured to adjust the sound pressure level and harmonic distortion of the speaker 8 in the working frequency range.

There is one or more the through holes 5'. The cross-sectional of the through hole 5' perpendicular to the vibration direction is any one of a circle, an ellipse, a square, a rectangle and a triangle.

The assembly structure of the speaker in this embodiment does not limit a type of the speaker, and the speaker may be a MEMS speaker or a speaker manufactured by other processes.

In the second embodiment, the fixing portion 6 and the baffle plate 3' are formed together by an integral molding process. Of course, it is not limited to this, the fixing portion 6 and the baffle plate 3' can also be separated, and the manufacturing process can also be different.

In the second embodiment, the viscous substance 7 is silicon. Silicon used as the viscous substance 7 can make a sealing effect of the assembly is good and the operation process simple. Of course, it is not limited to this, and other glue materials for forming a fixed sealing structure between the fixing portion 6 and the speaker 8 are also possible.

Third Embodiment

According to the structure of the MEMS speaker 100 of the first embodiment and that of the speaker assembly structure 400 of the second embodiment, designers can reasonably adjust the volume of the sounding inner cavity and that of the through hole, so that the sound pressure level of the speaker is high and harmonic distortion is small. Specifically, the present disclosure also provides a method for designing an acoustic indicator of a speaker.

Figure 8:
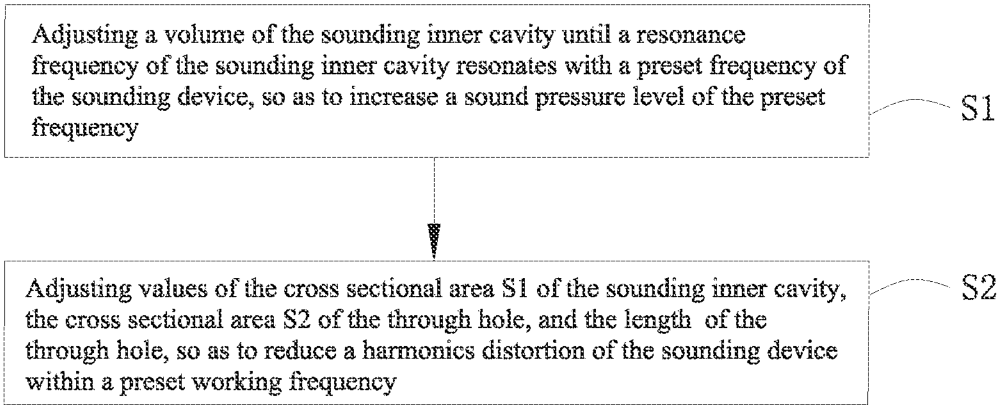
FIG. 8 is a flow chart of a method for designing a speaker acoustic indicator according to an embodiment of the present disclosure.

Please refer to FIG. 8, which is a flow chart of the method for designing a speaker acoustic index according to an embodiment of the present disclosure. The method for designing the speaker acoustic indicator is based on the MEMS speaker 100 or the speaker assembly structure 400.

Taking the MEMS speaker 100 as an example, the method for designing the acoustic indicator of the speaker includes following steps:

Step S1, adjusting a volume of the sounding inner cavity 4 until a resonance frequency of the sounding inner cavity 4 resonates with a preset frequency of the sounding device 100, so as to increase a sound pressure level of the preset frequency;

Step S2, adjusting values of the cross-sectional area S1 of the sounding inner cavity 4, the cross-sectional area S2 of the through hole 5, and the length l of the through hole, so as to reduce a harmonics distortion of the sounding device 100 within a preset working frequency.

For the speaker assembly 400, the method for designing the acoustic indicator of the speaker is basically the same as the above-mentioned method, and will not be repeated.

The sound pressure level of the speaker of the present disclosure can be effectively improved, and the harmonic distortion can be effectively reduced by the method for designing the acoustic indicator of the speaker provided by the present disclosure.

Compared with the related art, the speaker provided by the present disclosure is formed by a baffle plate, a substrate and a vibration sounding portion together to form a sounding inner cavity, and a through hole is defined on the baffle plate, and the resonant frequency of the cavity is adjusted by the volume of the sounding inner cavity. The volume of the through hole is configured to adjust the sound pressure level and harmonic distortion of the speaker within the working frequency range. This structure allows designers to reasonably adjust the volume of the sounding inner cavity and that of the through hole, so that the sound pressure level of the speaker is high while the harmonic distortion of the speaker is small.

In the speaker assembly structure provided by the present disclosure, the through hole is defined on the baffle plate, and the resonant frequency of the cavity is adjusted through the volume of the sounding inner cavity. The volume of the through hole is configured to adjust the sound pressure level and harmonic distortion of the speaker in the working frequency range. This structure allows designers to reasonably adjust the volume of the sounding inner cavity and that of the through hole, so that the sound pressure level of the speaker is high while the harmonic distortion of the speaker is small.

Although some specific embodiments of the present disclosure have been described in detail through examples, those skilled in the art should understand that the above examples are only for illustration and not for limiting the scope of the present disclosure. It should be understood by a person skilled in the art that the above embodiments can be modified without departing from the scope and spirit of the present disclosure. The scope of the present disclosure is defined by the attached claims.

What is claimed is:

1. A Micro-Electro-Mechanical-Systems (MEMS) speaker, comprising:

a substrate;

a vibration sounding portion; and a baffle plate;

wherein a first end and a second end of the substrate are open and the substrate is a hollow shape; the vibration sounding portion is configured to emit a sound wave within a range of human ear auditory frequency when excited by an electrical signal, and the vibration sounding portion is fixed to and covered on the first end of the substrate, and the sound wave generated by vibration of the vibration sounding portion conforms to a classical sound wave theorem; the baffle plate is covered and fixed on the second end of the substrate; the baffle plate, the substrate, and the vibration sounding portion together form a sounding inner cavity, a volume of the sounding inner cavity is configured to adjust a resonance frequency of the sounding inner cavity, so that the resonance frequency of the sounding inner cavity resonates with a preset frequency of the MEMS speaker; a through hole is defined on the baffle plate, the sounding inner cavity communicates with an outside world through the through hole, and a volume of the through hole is configured to adjust a sound pressure level and harmonic distortion of the MEMS speaker within a working frequency range.

2. The MEMS speaker according to claim 1, wherein a number of the through hole is one or more.

3. The MEMS speaker according to claim 1, wherein a cross-sectional, of the through hole, being perpendicular to a vibration direction is one of a circle, an oval, a square, a rectangle, and a triangle.

4. The MEMS speaker according to claim 1, wherein the MEMS speaker is a piezoelectric speaker made by a MEMS process.

5. The MEMS speaker according to claim 1, wherein the vibration sounding portion is driven by an electromagnetic signal, a piezoelectric signal or an electrostatic signal.

6. The MEMS speaker according to claim 1, wherein the substrate and the baffle plate are connected by a bonding process.

7. The MEMS speaker according to claim 1, wherein a cross-sectional, of the through hole, being perpendicular to a vibration direction is one of a circle, an oval, a square, a rectangle, and a triangle.

* * * * *